Dec. 13, 1938.　　　J. FITZPATRICK　　　2,139,741
FOOT MEASURING DEVICE
Filed June 21, 1937　　　3 Sheets-Sheet 1

INVENTOR
Jeremiah Fitzpatrick
BY John E. R. Hayes
ATTORNEY

Dec. 13, 1938.  J. FITZPATRICK  2,139,741
FOOT MEASURING DEVICE
Filed June 21, 1937  3 Sheets-Sheet 2

INVENTOR:
Jeremiah Fitzpatrick
BY John E. P. Hayes
ATTORNEY

Patented Dec. 13, 1938

2,139,741

UNITED STATES PATENT OFFICE 2,139,741

FOOT MEASURING DEVICE

Jeremiah Fitzpatrick, Weymouth, Mass.

Application June 21, 1937, Serial No. 149,413

15 Claims. (Cl. 33—3)

This invention relates to foot measuring devices and pertains especially to a foot measuring device like that shown in my Letters Patent of the United States No. 1,872,921 of August 23, 1932.

As shown in said patent there is provided a foot measuring device by which the foot is centered preliminary to measurement along a line passing through the longitudinal centre of the foot and there the foot is accurately measured as to length and width, with indications of such measurement shown in terms of a proper sized shoe for such measurement.

For obtaining the measurement, heel, toe and side stops are employed, each set of stops being simultaneously movable in equal amount towards and away from one another. The bearing of the heel and side stops against the foot assists in the positioning thereof preliminary to measurement, and the essential object of the invention is to provide an arrangement whereby the foot may be accurately positioned by these stops preliminary to measurement, without pressure on the foot, any undue pressure tending to prevent an accurate measurement, especially when weight is brought upon the foot, and to obtain accurate measurement the full weight of the person should be brought onto the foot being measured.

A further object of the invention is to provide a foot measuring device like the present device, in which the heel and toe stops are movable towards and away from one another in an equal amount and so occupy the same relative position with relation to an intermediate point for all sizes of shoes, with mechanism for measuring the height of the instep for any size foot, and means for indicating such measurement.

The invention can best be seen and understood by reference to the drawings in which Fig. 1 is a plan of the device.

Fig. 4 shows partly in side elevation and partly in cross section a detail construction, to which reference will later be made.

Figure 1:
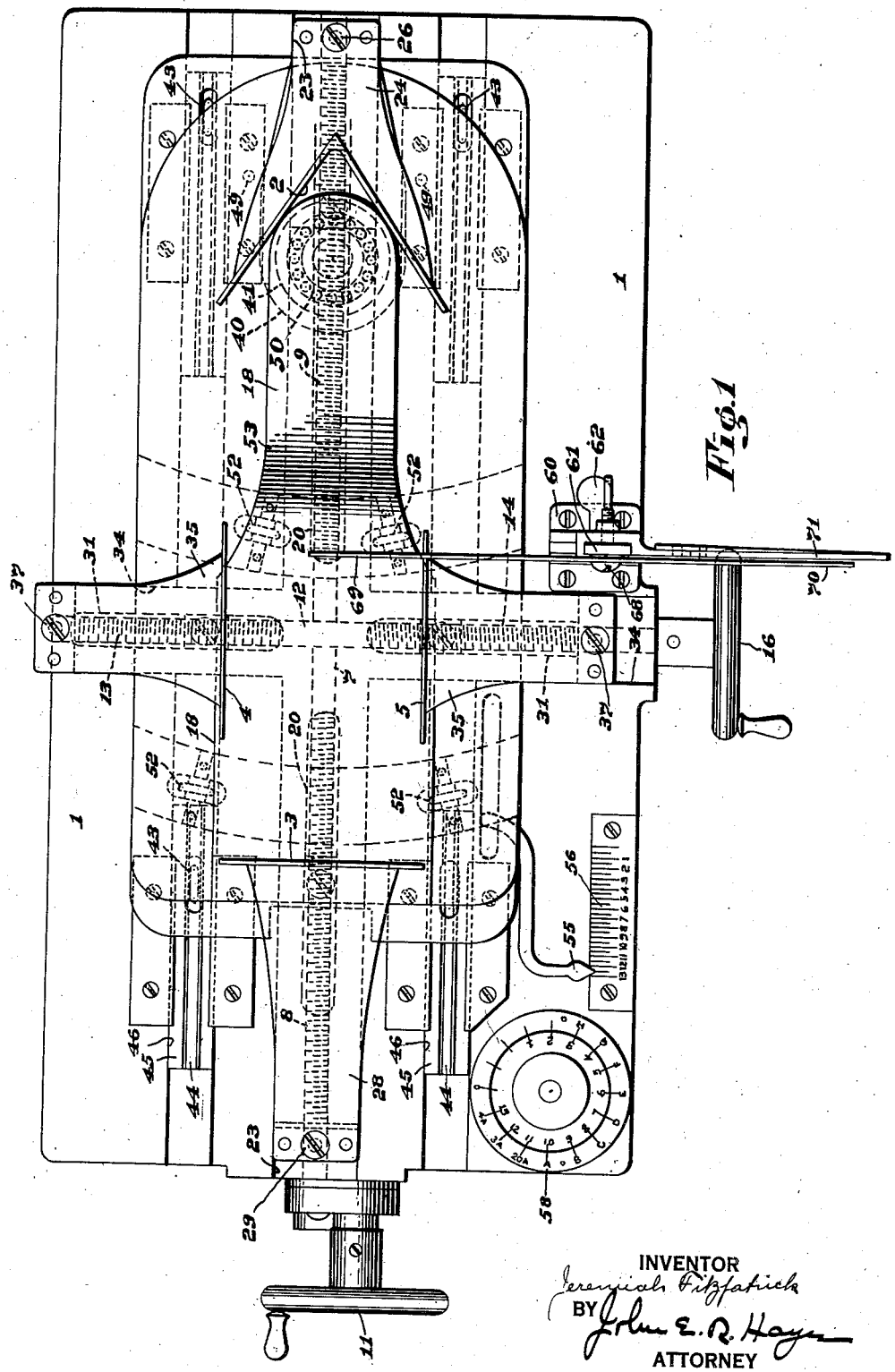
Figure 2:
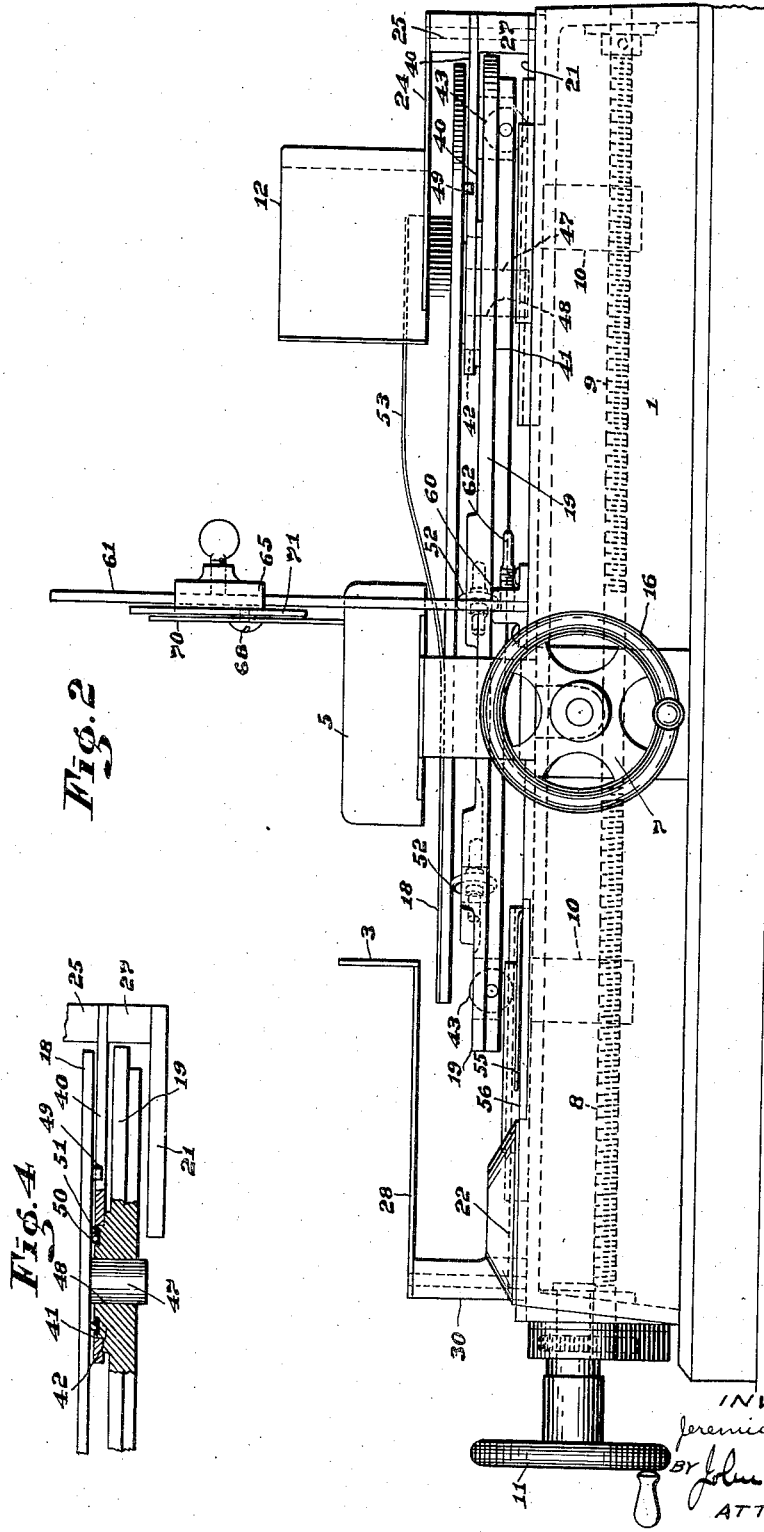
Fig. 2 is a side elevation.
Figure 3:
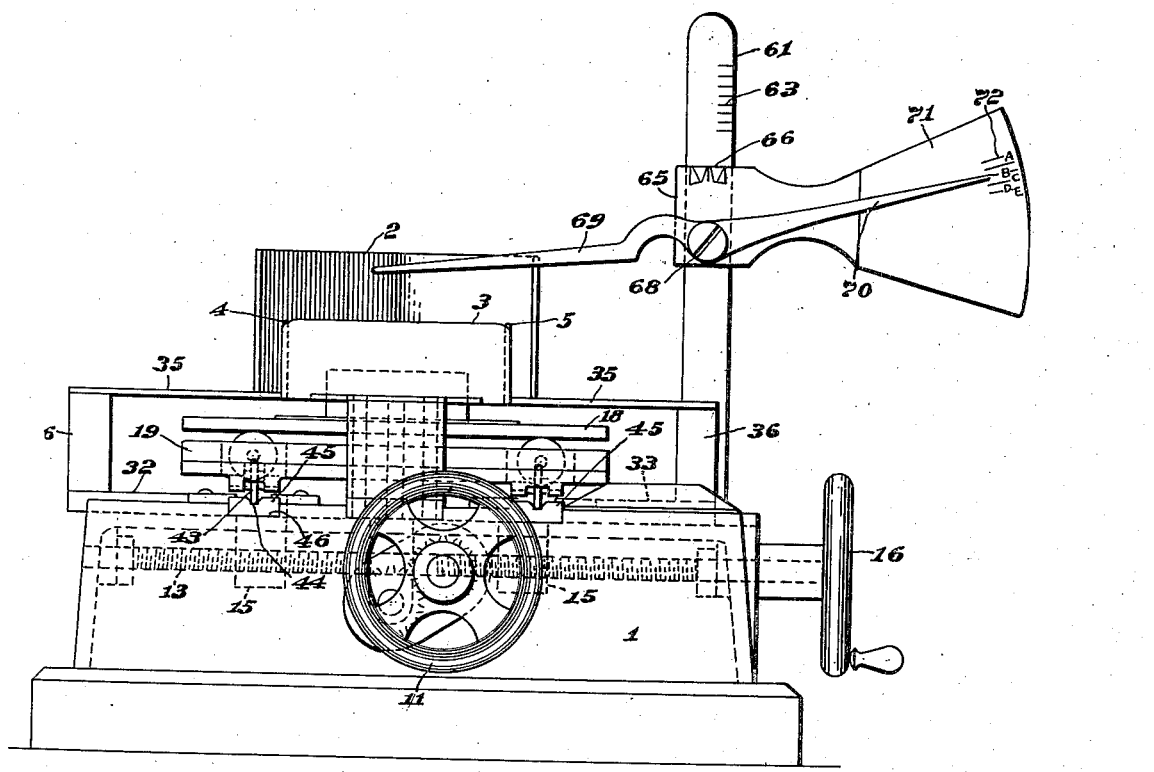
Fig. 3 is a fore end elevation.

Referring to the drawings: 1 represents the chambered bed of the device.

Arranged to be movable over the bed 1 are heel and toe stops 2 and 3, respectively, for measuring the length of the foot; also side stops 4 and 5, respectively, for measuring the width of the foot. These various stops bear a determinate relationship to one another, as referred to in my said patent, and are operated substantially as shown in said patent. The heel and toe stops for measuring the length of the foot are operated by means of a screw 7 provided with right and left threaded portions 8 and 9, each having a nut 10 arranged upon it with which the heel and toe stops 2 and 3 connect, as will later be explained, whereby they are moved simultaneously an equal amount in reverse directions towards and away from one another, depending as the screw is turned in one direction or the other. The screw 7 is mounted to turn in suitable bearings fixed within the bed 1. It projects outside of and beyond the fore end of the bed, and is turned by a crank 11 arranged upon its end. In similar manner the side stops 4 and 5 are moved towards and away from one another by means of a screw 12 provided with right and left threaded portions 13 and 14, each having a nut 15 arranged upon it with which the side stops 4 and 5 connect, as will later be explained, whereby they are moved simultaneously an equal amount in reverse directions towards and away from one another, depending as the screw is turned in one direction or the other. The screw 12 is mounted to turn in suitable bearings fixed within the bed. It projects outside of and beyond the side of the bed and is turned by a crank 16 arranged upon its end.

The foot when measured rests upon a foot rest 18 which is borne by a sliding carriage 19. The heel and toe stops 2 and 3 and side stops 4 and 5 extend over this foot rest and carriage. The heel and toe stops 2 and 3 are movable from the nuts 10 arranged on the oppositely threaded portions of the screw 7. Each of the nuts 10 is widened to extend upwardly through slots 20 cut within the top of the bed and along these slots the nuts are movable as the screw bearing the nuts is turned. Secured to the nuts 10 are slides 21 and 22, the slide 21 being secured to the nut which actuates the heel stop and the slide 22 to the nut whch actuates the toe stop. These slides for the respective nuts slide within ways 23 cut longitudinally within the top face of the bed. The heel and toe stops 2 and 3 are secured to the ends of these respective slides. The heel stop is borne by an arm 24 overhanging the rear end portions of the foot rest with end projection beyond the rear end of the foot rest and sliding carriage and the end thus projecting is widened by a piece or block 25 which is secured by a pin and screw connection 26 to a block 27 rising from the end of the slide 21. The toe stop 3 is borne by an arm 28 which projects forward beyond the ends of the foot rest and sliding carriage and is fastened by a screw and pin connection 29 to a block 30 rising from the end of the slide 22. The side stops 4 and 5 are movable from the nuts 15 arranged on the oppositely threaded portions of the screw 12. Each of the nuts 15 is widened to extend upwardly through a slot 31 cut within the top of the bed and along these slots the nuts are movable as the screw 12 bearing the nuts is turned. Secured to the nuts are slides 32 and 33, which are slidable within ways 34 cut laterally within the top face of the bed. The side stops are secured to the ends of these respective slides. Each side stop is borne by an arm 35 which extends laterally over the foot rest to project beyond the sides thereof and beyond the sides, also, of the sliding carriage. The ends of the arms thus projecting bear downwardly extending blocks 36 which are secured, respectively, to the ends of the slides 32 and 33 through suitable screw and pin connections 37.

The sliding carriage 19 is mounted to move longitudinally over the top face of the bed 1 in line with the movement of the heel and the toe stops and is movable with the heel stop. To be thus movable the carriage is provided with a tongue 40 fixed centrally thereto at the rear end portion of the carriage. The tongue is fixed to the carriage by a boring 41 in the tongue into which fits a boss 42 on the carriage. The tongue projects rearwardly beyond the rear end of the sliding carriage and the part thus projecting is interposed between the parts 25, 27, which form a portion of the connection between the slide 21 and the heel stop, the projecting end of the tongue 40 being secured by the same fastenings 26 as bind these parts together.

In order to maintain a true and precise longitudinal movement of the carriage over the bed, and to eliminate friction between the carriage and the bed, the carriage is provided with wheels 43 which run on tracks 44. These tracks consist of grooves in plate 45 which are fixed within longitudinal slots 46 in the top face of the bed.

The foot rest 18 moves longitudinally with the carriage and is pivoted to the carriage. To this end the foot rest is provided on its under side with a stud 47 which fits within a socket 48 formed within the boss 42 on the sliding carriage. The location of the stud and socket within which it turns is such that the pivotal connection between the foot rest and carriage will lie just forward of the heel stop. Thus pivotally arranged the foot rest will be free to turn laterally on the carriage, especially that portion of the foot rest which lies forward of its pivoted connection to the carriage, and on which portion of the foot rest the major part of the foot is resting when being measured. The lateral movement of the foot rest is limited by stops 49 on the under side thereof which engage the sides of the tongue 42. In order that the lateral movement of the foot rest with relation to the carriage may be a free and easy movement, and to eliminate friction in so far as possible, a ring 50 of ball bearings is interposed between the foot rest and sliding carriage at the point of its pivotal connection to the carriage. The ring encircles the stud 47 and the balls carried by the ring turn within a circular raceway 51 formed within the boss 42 on the carriage. The fore end portion of the foot rest rests upon wheels 52 journalled to turn on the sliding carriage. The foot rest is preferably made with a raised portion 53 lying forward of the heel plate and on which raised portion of the foot rest the heel and arched portion of the foot is adapted to rest.

In the operation of the device for measuring the foot all the stops, 2, 3, 4 and 5, are first turned out so that the foot to be measured placed upon the foot rest will fit freely between all the stops. The heel is then snugly inserted against the heel stop within the angle formed by this stop. The heel stop is now moved forward by turning the screw 7 and at the same time the toe stop will be moved in a reverse direction towards the heel stop, this for measuring the length of the foot. During this operation there will be no sliding movement of the foot over the foot rest for as the heel stop moves forward borne by the sliding carriage the foot rest will also move with the carriage carrying the foot with it. In other words, the person whose foot is being measured will ride up the foot rest and sliding carriage and his foot will be moved longitudinally into position where its length can be measured without any pressure being brought to bear upon it, especially by movement of the heel plate. The movements of the heel plate and toe plate are continued until the toe plate just about touches the toe of the foot.

The side stops are now moved in laterally to engage the sides of the foot at the ball portion of the foot. This operation, apart from affording means for measuring the width of the foot, brings the foot into a true and proper longitudinal alignment between the heel and toe stops for accurate measurement. During this operation one or the other of the side stops will first engage the side of the foot, but substantially no pressure will be exerted upon the side of the foot owing to the substantially frictionless mounting of the foot rest upon the sliding carriage. The foot rest and foot borne by it will move laterally when pressure is brought onto one side of the foot by either of the side stops. When both side stops have been brought in to rather snugly embrace the sides of the foot the heel and toe stops are now moved in order that a precise measurement of the length of the foot may be obtained when the foot is held in true longitudinal position for measurement. This measurement is indicated through a pointer 55 on a scale 56 on the bed substantially as explained in my said patent. After the measurement of the foot for length the side stops are adjusted so as to bear rather lightly, though snugly, against the sides of the foot and measurement is then taken by an indicating means 58 on the bed, substantially as explained in my said patent.

In a foot measuring device it is desirable that the foot be measured not only for length and width but also that the instep be measured for height in order that a shoe be provided in which the upper will lace properly over the tongue and instep.

In a device like the present device the heel and toe stops are movable towards and away from one another in an equal amount and so occupy the same relative position with relation to an intermediate point for all sizes of shoes. Such intermediate point may be chosen as the point at which the instep is to be measured for all sizes of shoes. Located on the bed of the device laterally offset from the point thus chosen, is a base piece 60 in which a standard 61 is socketed and held fixed in any suitable manner as by a set screw 62. The standard bears on its side notations 63 which correspond with the different sizes of shoes, the notations gradually increasing in height on the standard as the size increases, and the notation for any size being at a height substantially commensurable with the height of the instep of a normal foot of that size when in position for measurement in the device.

Slidable upon the standard is a block 65 having an indicating edge 66 which may be brought into proper conjunction with any of the notations on the standard and there fixed by a thumb piece 67 which passes through the block and binds against the side of the standard.

Pivoted to the block by a pin 68 is a lever, one arm 69 of which is adapted to be brought into contact with the instep of a foot when positioned for measurement in the foot measuring device. The other opposing arm 70 of the lever, operating as a pointer, co-operates with a wing forming dial plate 71 fixed to the block and having notations 72 thereon which correspond with different sizes of insteps for different sizes of shoes. In the operation after the foot has been properly positioned for measurement for both length and width the block 65 is moved up where its indicating edge 66 will be in conjunction with the size of shoe noted on the standard which corresponds with the size of shoe for length demanded by the foot being measured. The arm 69 is now moved down into contact with the instep, the height of which is then indicated on the dial 71 by the indicating arm 70 of the lever.

I claim:

1. In a foot measuring device having a heel stop and a toe stop between which the foot is measured for length, and means for changing the relative position of said stops towards or away from one another, the combination therewith of a foot rest, and means for mounting said foot rest whereby it will move with one of said stops as the relative position of said stops is changed.

2. In a foot measuring device having a heel stop and a toe stop between which the foot is measured for length, and means for changing the relative position of said stops towards or away from one another, the combination therewith of a foot rest, and means for mounting said foot rest whereby it will move with said heel stop as the relative position of said stops is changed.

3. In a foot measuring device having a heel stop and a toe stop between which the foot is measured for length, and means for simultaneously moving said heel and toe stops towards or away from one another, the combination therewith of a foot rest, and means for mounting said foot rest whereby it will move with one of said stops as said stops are moved.

4. In a foot measuring device having a heel stop and a toe stop between which the foot is measured for length, and means for simultaneously moving said heel and toe stops towards or away from one another, the combination therewith of a foot rest, and means for mounting said foot rest whereby it will move with said heel stop as said stops are moved.

5. In a foot measuring device having side stops between which the foot is measured for width, and means for changing the position of said side stops in relation to one another, the combination therewith of a foot rest, and means for mounting said foot rest whereby it will have free lateral movement in relation to said side stops.

6. In a foot measuring device having side stops between which the foot is measured for width, and means for simultaneously moving said side stops towards or away from one another, the combination therewith of a foot rest, and means for mounting said foot rest whereby it will have free lateral movement in relation to said side stops.

7. In a foot measuring device having a set of heel and toe stops between which the foot is measured for length, a set of side stops between which the foot is measured for width, and means for changing the position of the stops in each of said sets of stops, the combination therewith of a foot rest, and means for mounting said foot rest whereby it will move with one of said first set of stops and have a free lateral movement with relation to said second set of stops.

8. In a foot measuring device having a set of heel and toe stops between which the foot is measured for length, a set of side stops between which the foot is measured for width, and means for changing the position of the stops in each of said sets of stops, the combination therewith of a foot rest, and means for mounting said foot rest to move with the heel stop of said first set of stops and have a free lateral movement with relation to said second set of stops.

9. In a foot measuring device having a bed, a heel stop and a toe stop between which the foot is measured for length, and means for changing the position of said stops in relation to one another, the combination therewith of a sliding carriage mounted upon said bed and connected to be movable with one of said stops, and a foot rest connected to be movable with said carriage and mounted thereon.

10. In a foot measuring device having a bed, a heel stop and a toe stop between which the foot is measured for length, and means for simultaneously moving said heel and toe stops towards and away from one another, the combination therewith of a sliding carriage mounted upon said bed and connected to be movable with said heel stop, and a foot rest connected to be movable with said carriage and mounted thereon.

11. In a foot measuring device having a set of heel and toe stops between which the foot is measured for length, a set of side stops between which the foot is measured for width, and means for changing the position of the stops in each of said sets of stops, the heel and toe stops in a longitudinal direction and the side stops in a lateral direction, the combination therewith of a foot rest over which said stops extend, a sliding carriage mounted upon said bed and movable longitudinally thereon, and means for mounting said foot rest upon said carriage whereby it will be longitudinally movable therewith and be laterally movable with relation to said side stops.

12. In a foot measuring device having a set of heel and toe stops between which the foot is measured for length, a set of side stops between which the foot is measured for width, and means for changing the position of the stops in each of said sets of stops, the heel and toe stops in a longitudinal direction and the side stops in a lateral direction, the combination therewith of a foot rest over which said stops extend, a sliding carriage mounted upon said bed and connected to be movable with one of said first set of stops, and means for mounting said foot rest upon said carriage whereby it will be movable therewith and be laterally movable with relation to said side stops.

13. In a foot measuring device having a set of heel and toe stops between which the foot is measured for length, a set of side stops between which the foot is measured for width, and means for simultaneously moving the stops in each of said sets of stops towards or away from one another, the combination therewith of a foot rest over which said stops extend, a sliding carriage mounted upon said bed and connected to be movable with the heel stop of said first named set of stops, and means for mounting said foot rest upon said carriage whereby it will be movable therewith and be laterally movable with relation to said side stops.

14. In a foot measuring device having a set of heel and toe stops between which the foot is measured for length, a set of side stops between which the foot is measured for width, and means for changing the position of the stops in each of said sets of stops, the heel and toe stops in a longitudinal direction and the side stops in a lateral direction, the combination therewith of a foot rest over which said stops extend, a sliding carriage mounted upon said bed and movable longitudinally thereon, and means for pivotally mounting said foot rest upon said carriage whereby it will be longitudinally movable therewith and be laterally movable with relation to said side stops.

15. In a foot measuring device having a set of heel and toe stops between which the foot is measured for length, a set of side stops between which the foot is measured for width, and means for simultaneously moving the stops in each of said sets of stops towards and away from one another, the stops in said first named set of stops in a longitudinal direction and the stops in said second named set of stops in a lateral direction, the combination therewith of a foot rest over which said stops extend, a sliding carriage mounted upon said bed and connected with the heel stop of said first named set of stops to be longitudinally movable therewith, and means for pivotally mounting said foot rest upon said carriage whereby it will be longitudinally movable therewith and be laterally movable with relation to said side stops.

JEREMIAH FITZPATRICK.